Feb. 9, 1965   J. RUDELICK   3,169,110
CONTROL VALVE MECHANISM FOR WATER TREATING DEVICE
Filed April 2, 1962   5 Sheets-Sheet 1

INVENTOR
John Rudelick
BY
ATTORNEYS

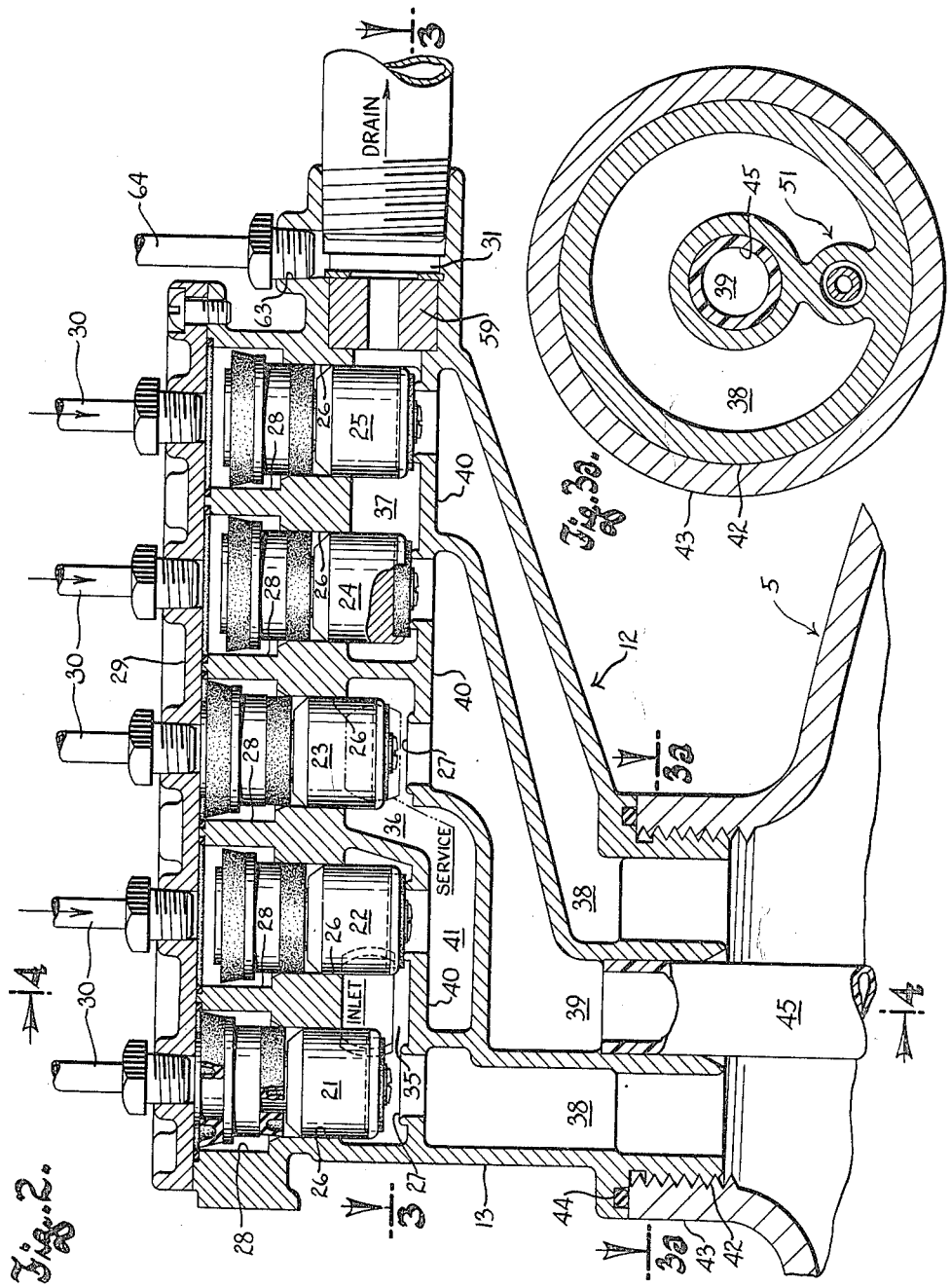

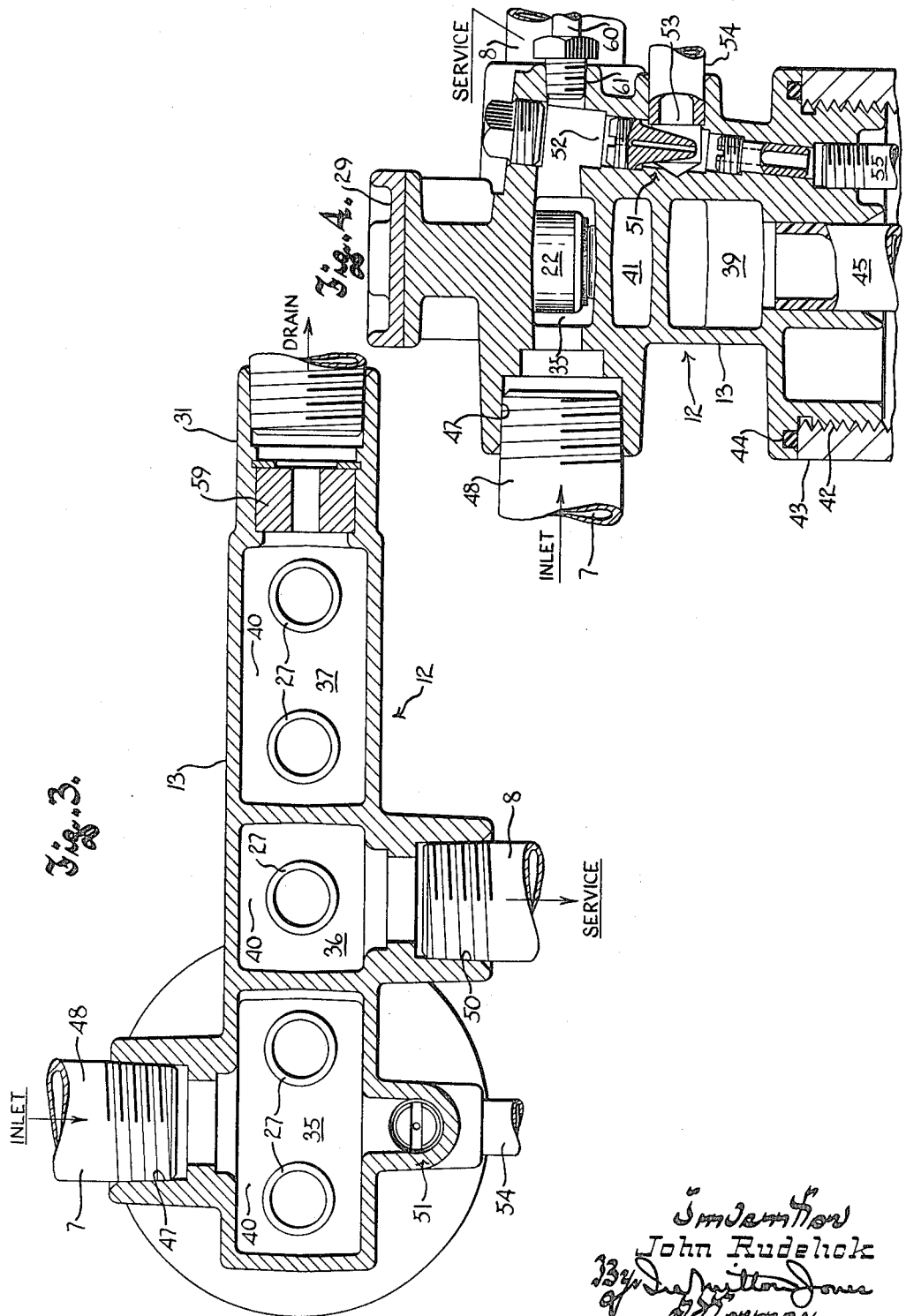

Feb. 9, 1965   J. RUDELICK   3,169,110
CONTROL VALVE MECHANISM FOR WATER TREATING DEVICE
Filed April 2, 1962   5 Sheets-Sheet 4
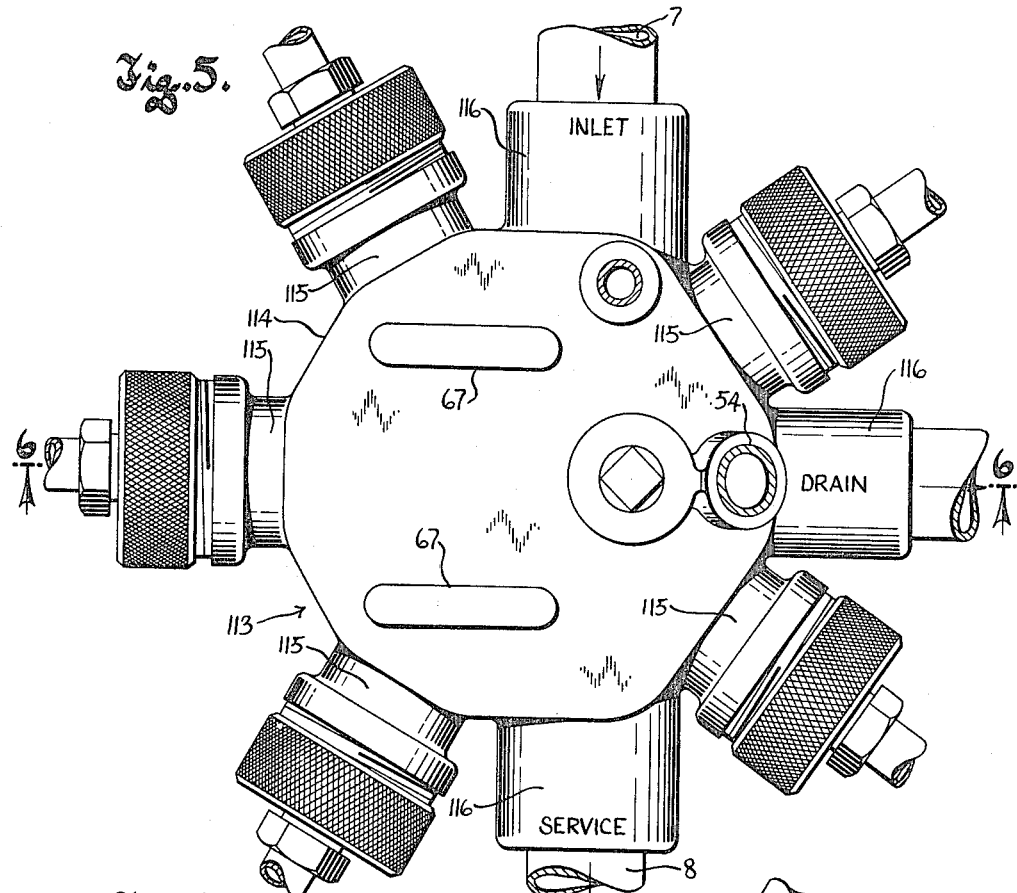
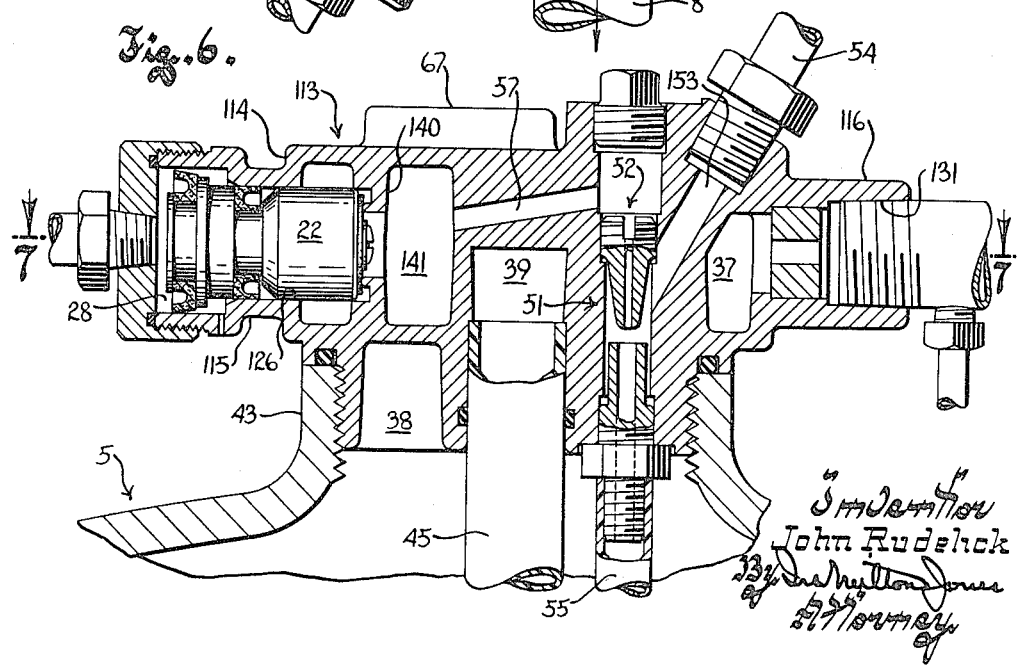

Feb. 9, 1965        J. RUDELICK        3,169,110
CONTROL VALVE MECHANISM FOR WATER TREATING DEVICE
Filed April 2, 1962                    5 Sheets-Sheet 5

Inventor
John Rudelick 3,169,110
CONTROL VALVE MECHANISM FOR WATER
TREATING DEVICE
John Rudelick, Milwaukee, Wis., assignor to Bruner Corporation, Milwaukee, Wis., a corporation of Wisconsin
Filed Apr. 2, 1962, Ser. No. 184,257
6 Claims. (Cl. 210—191)

This invention relates to water treating apparatus, and refers more particularly to automatic water treating apparatus of the type wherein water flowing from a source to a service system is normally passed through a bed of ion exchange type treating material in a water treating tank, and wherein the water treating material is periodically regenerated by causing regenerant liquid to flow therethrough and then causing untreated water from the source to be passed through the tank and water treating material to rinse the regenerant liquid from the same.

In general it is an object of this invention to provide, in automatic water treating apparatus, a control valve assembly which serves as a cover that sealingly closes the top of the water treating tank of the apparatus and which incorporates all of the necessary connections between said tank and the rest of the apparatus so that the external plumbing connections to the tank are eliminated along with the possibilities of leaks and the cluttered appearance which such connections would otherwise present. Minimization of tank connections is particularly desirable in the case of glass lined tanks, wherein the attainment of a satisfactory lining around spuds is especially difficult.

Another and more specific object of this invention is to provide a very compact, neat appearing and relatively inexpensive valve assembly for automatic water treating apparatus such as automatic water softeners, which valve assembly comprises a timing mechanism, a pilot valve and a number of control valves, and is adapted to fit on the top of a water treating tank containing a bed of water treating material.

A further specific object of this invention is to provide a control mechanism for automatic water treating apparatus having a minimum number of external connections between its elements and between it and other units of the apparatus, to thus minimize the possibility of leaks, facilitate and expedite manufacture and installation of the apparatus, and afford a unit having an unusually attractive and uncluttered appearance.

It is also an object of this invention to provide simple and inexpensive structure in a control mechanism for an automatic water softener or the like, which incorporates features heretofore found only in water softeners intended for commercial and industrial applications, but which is nevertheless so compact and inexpensive as to be well suited for domestic installations.

Still another object of this invention is to provide a control valve assembly for water treating apparatus of the character described which incorporates a plurality of pressure responsive valves in one compact unit.

It is a further object of this invention to provide a control valve for water treating apparatus and the like which incorporates a plurality of piston valves and an eductor, and which further incorporates connections between the several valves and the eductor as well as connections with a water treating tank for which it provides a cover.

It is also an object of this invention to provide water treating apparatus of the character described comprising a control valve assembly having its several ports so located as to make very convenient the installation of plumbing connections thereto.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

FIGURE 2 is a vertical sectional view of the control mechanism of this invention shown installed on the top of a water treating tank;

FIGURE 3 is a cross sectional view taken on the plane of the line 3—3 in FIGURE 2;

FIGURE 3a is a cross sectional view taken on the plane of the line 3a—3a in FIGURE 2;

FIGURE 4 is a vertical sectional view taken on the plane of the line 4—4 in FIGURE 2;

FIGURE 5 is a top view of a modified embodiment of the control valve of this invention;

FIGURE 6 is a sectional view taken on the plane of the line 6—6 in FIGURE 5;

Figure 1:
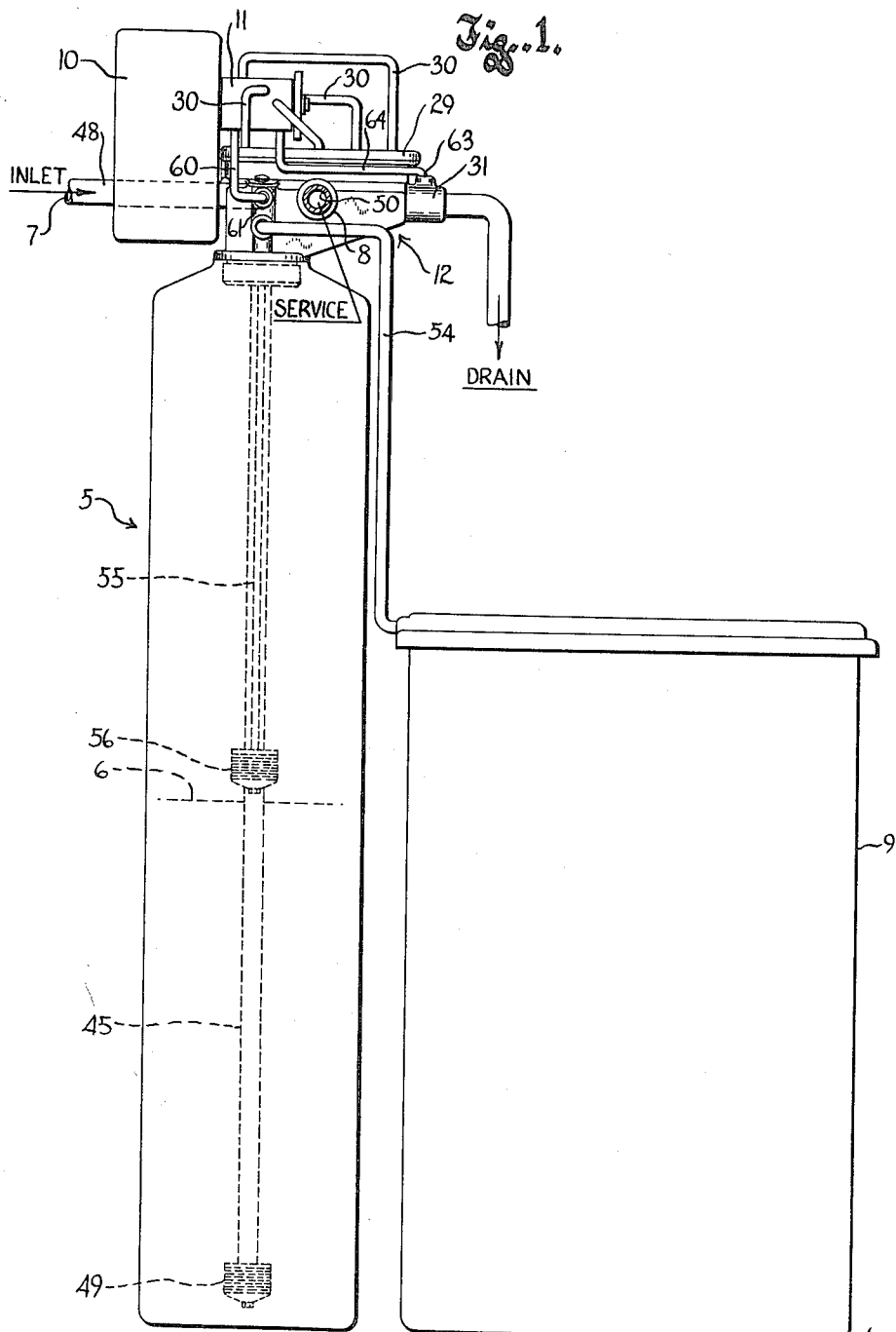
FIGURE 1 is a side elevational view of water treating apparatus embodying the principles of this invention.

Referring now to the accompanying drawings, the numeral 5 designates generally a water treating tank containing a bed 6 of water treating material, such as synthetic resin, of the type usually referred to as ion exchange material but which strictly speaking is a cation exchange material. In normal operation untreated water from a source 7 thereof is conducted to the top of the tank to be circulated downwardly therethrough and through the bed of water treating material, and thence to a service system duct 8. From time to time the water treating material must be regenerated by passing therethrough a regenerant liquid such as brine from a brine storage vessel 9 and thereafter rinsing the regenerant liquid out of the tank and ion exchange material by circulating untreated water therethrough before normal service operation is resumed.

Regeneration is effected by means of control mechanism comprising a timing device 10, a pilot valve 11 actuated by the timing device, and a novel control valve assembly 12 which provides a cover for the tank 5. The control valve assembly 12 is substantially elongated so as to extend laterally to one side of the tank axis. The timing device 10, which can be mounted on the end of the control valve assembly at the other side of the tank axis, can be an electric clockwork mechanism of conventional type. The pilot valve 11 can comprise a rotating spindle valve of the type disclosed and claimed in my copending application, Serial No. 184,258, filed April 2, 1962, now Patent No. 3,134,403, granted May 26, 1964, and can be mounted adjacent to the timing device and above the control valve assembly with its axis extending parallel to the length of the latter.

As best seen in FIGURE 2, the control valve assembly comprises a housing 13 and five piston-like valve elements 21, 22, 23, 24 and 25, slidable in upright bores 26 in the housing that are spaced along a line extending lengthwise of the housing. As described more in detail hereinafter, the housing is so formed as to provide a smaller diameter annular valve seat 27 coaxial with each bore and thereheneath, and with which the valve element in the bore engages when in a closed position. Each of the bores 26 opens at its upper end to an upwardly opening counterbore 28 that cooperates with the valve element to provide a pressure chamber. The counterbores 28 are closed at their mouths by a cover plate 29 on the top of the housing, which is ported to provide for the connection of small ducts 30 that communicate the several pressure chambers with ports on the rotatable spindle pilot valve 11.

For details of the construction and operation of the pilot valve reference may be made to the aforesaid copending application. Suffice it to say at this point that the pilot valve is communicated with the untreated water source 7 and with a drain outlet 31 in the housing that is connectable to a sewer or the like, and in each of the several defined positions of the pilot valve it communicates each of the pressure chambers 28 with either the untreated water inlet 7 or the drain 31. When untreated water under pressure is introduced into any one of the pressure chambers 28, its associated piston-like valve element is forced down into engagement with its seat 27, closing the valve. When the pressure chamber for any one of the valves is vented by communicating it with the drain outlet, the valve element is permitted to move upwardly away from its seat, to an open position, in response to the pressure of liquid therebeneath.

The interior of the housing is divided by partition wall members into a number of compartments, namely an inlet compartment 35, a service compartment 36, a drain compartment 37, a top-of-tank compartment 38 and a bottom-of-tank compartment 39. Certain of these partition members, designated by 40, are parallel to the cover plate and spaced therebeneath. These have the valve seats 27 formed in them, and the inlet compartment 35, the service compartment 36 and the drain compartment 37 are located above them, while the other two compartments 38 and 39 are below them. A portion 41 of the service compartment, however, is disposed beneath the inlet compartment to be communicable with the latter through the seat for the valve 22. The service compartment is located intermediate the inlet and drain compartments along the length of the housing, the inlet compartment being nearest the tank axis.

The lower portion of the housing, which includes the top-of-tank compartment 38 and the bottom-of-tank compartment 39, is formed to have a sealing fit in the top of the tank 5, preferably having a threaded exterior, as at 42, which is adapted to be received in a correspondingly threaded neck 43 at the top of the tank. An O-ring 44 or other suitable gasket can be confined between the bottom of the housing and the top of the tank to insure a good seal between these parts.

The top-of-tank compartment 38, which is substantially horseshoe shaped (see FIGURE 3a), opens directly downwardly into the top of the tank. The bottom-of-tank compartment 39 likewise communicates with the interior of the tank, but does so through a substantially long duct 45 that terminates near the bottom of the tank.

In normal service operation of the apparatus the pilot valve communicates the pressure chambers for valves 22, 24, and 25 with a source of fluid under pressure (namely the untreated water source 7) to hold those valves closed, and vents the pressure chambers of valves 21 and 23 to permit those valves to remain open. FIGURE 2 thus shows the valves in their positions for normal service operation.

Untreated water from the source 7 enters the housing by way of a duct 48 which is connected to an inlet port 47 that opens to the inlet compartment 35 and which is located at one long side of the housing near the tank axis. The inlet compartment is communicable with the top-of-tank compartment 38 through the seat for the valve 21, and hence during normal service operation, when valve 21 is open, untreated water flows from the source 7, through the inlet and top-of-tank compartments, and thence directly into the upper portion of the tank for downward flow through the bed of treating material. The water thus treated flows out of the bottom of the tank through the long duct 45, which is preferably provided with a suitable strainer 49 at its lower end. The bottom-of-tank compartment 39, into which the duct 45 opens at its upper end, is in turn communicated with the service compartment 36 through the seat for the valve 23, which is also open during normal service operation. A service port 50, opening from the service compartment at the side of the housing remote from the inlet port 47 (see FIGURE 3), provides for connection of the service compartment with the service system duct 8 through which the treated water can flow to its point of use.

The housing also includes an eductor 51 which extends generally vertically through the housing near the side thereof remote from the inlet port and directly opposite said port. The inlet 52 of the eductor, as best seen in FIGURE 4, is near the top of the housing and is in open communication with the inlet compartment 35. The side eduction inlet 53 of the eductor comprises a port located at the side of the housing directly opposite the untreated water inlet port 47, and is communicated with the regenerant fluid source 9 by means of duct 54. The outlet of the eductor comprises a duct 55 which extends downwardly in the water treating tank to a point intermediate the top and bottom of the tank and closely adjacent to the top of the bed 6 of water treating material. Preferably the eductor outlet duct 55 has a strainer 56 at its lower end.

When regeneration of the water treating material is to be initiated, the timing device 10 moves the pilot valve 11 to a position in which it communicates the pressure chambers of the valves 21, 23 and 25 with the hard water source, closing those valves, and vents the pressure chambers of valves 22 and 24 to allow them to open. With the closing of valve 21, untreated water can no longer flow from the inlet compartment 35 to the top-of-tank compartment 38, and is thus excluded from the tank. However, with the opening of valve 22 such water can flow from the inlet compartment to the service compartment, to make untreated water available to the service system during the regeneration cycle. Through the seat for open valve 24 the bottom-of-tank compartment 39 is communicated with the drain compartment 37. The drain outlet 31 comprises a port that opens from the drain compartment, at the end of the housing body remote from the timing device 10 and the inlet port 47, and this port is connectable to a sewer drain or the like to provide for voiding of spent regenerant fluid and rinse water that flows up from the bottom of the tank through the long duct 45 during the first portion of the regeneration cycle.

With the valve 21 closed and the valve 24 open, there is a pressure difference across the eductor 51 which causes water to flow therethrough from the inlet compartment 35 to the outlet of the duct 55. As a result, regenerant fluid is educted from the regenerant vessel 9.

Because the outlet of the duct 55 is closely adjacent to the top of the bed of ion exchange material, regenerant liquid is brought to the material in concentrated form, not substantially diluted by untreated water standing in the top of the tank above the level of the outlet of duct 55. In the case of water softening ion exchange material, with which brine is used as the regenerant, this feature is especially important because the efficiency of salt solution as a regenerating agent is dependent upon its concentration.

When the desired quantity of regenerant liquid has been educted from the vessel 9, withdrawal of regenerant liquid therefrom is terminated, as by closing of a valve (not shown) associated with the duct 54, but untreated water continues to flow into the tank through the eductor for a time, to effect a slow downflow rinse of the ion exchange material.

At the conclusion of this rinsing period the timing device 10 shifts the pilot valve 11 to another predetermined position at which backwashing of the tank and ion exchange material is effected. During such backwashing the pressure chambers for valves 21 and 24 are communicated by the pilot valve with the untreated water source, so that those valves remain closed, while the pressure chambers of valves 22, 23 and 25 are vented to permit those valves to remain open. With valve 21 remaining closed and valve 22 remaining open, untreated water can continue to be made available to the service system, bypassing the tank. With valve 23 open, untreated water can also flow from the service compartment to the bottom-of-tank compartment, for circulation downwardly to the outlet of the long duct 45 and thence upwardly through the tank, into the top-of-tank compartment, and to the drain compartment by way of the seat of the open valve 25. A flow restrictor 59 in the drain outlet 31 prevents excessively fast backwashing circulation by which particles of ion exchange material might be carried out of the tank and to the drain.

After a predetermined backwashing period, the timing device shifts the pilot valve to another predetermined position at which a fast downflow rinse or flushing is effected. For this the valve 21 is reopened to allow untreated water to flow from the inlet to the top-of-tank compartment, while valve 22 remains open to communicate the inlet compartment with the service compartment so as to continue to make untreated water available to the service system. (Note that valve 22 is open for this purpose during the entire regeneration cycle.) Untreated water entering the top of tank circulates downwardly therethrough to the lower end of the elongated duct 45, upwardly through said duct to the bottom-of-tank compartment and thence, through the seat of the open valve 24, to the drain. Valves 23 and 25 remain closed during flushing, and the flow restrictor 59 again controls the rate at which rinse water is circulated through the tank.

After a predetermined interval of such downflow flushing, the timing device returns the pilot valve to its normal service position.

It will be recalled that the eductor has its inlet at all times communicated with the inlet compartment, and hence during the backwash and flush portions of the regeneration cycle, when there is no substantial pressure difference between the inlet and the outlet of the eductor, untreated water flows out through its side eduction outlet to the regenerant liquid supply vessel 9, where such water is used to provide regenerant liquid for the next regeneration cycle. As mentioned above, the regenerant liquid duct 54 is equipped with a suitable valve (conventionally a float valve) by which withdrawal of regenerant from the vessel 9 is terminated when liquid therein reaches a predetermined low level and by which filling of said vessel is terminated when water therein reaches a predetermined high level.

It will now be apparent that all of the connections between the tank 5 and the remainder of the apparatus are provided by the housing 13 and the two ducts 45 and 55 which extend downwardly therefrom into the interior of the tank. It is noteworthy that the housing compartmentation is so arranged that the inlet and service ports can be located on opposite sides thereof, near one end, while the drain port is located at its other end, thus greatly facilitating the installation of plumbing connections to the control valve unit.

The pilot valve is communicated with the untreated water source 7 by means of a small duct 60 that is connected to a port 61 opening from the inlet chamber of the housing directly adjacent to the eductor inlet 52. Another port 63 in the housing, opening upwardly from the drain outlet 31, is communicated by means of a duct 64 with the pilot valve to provide its vent connection. The ducts 60 and 64, and the several ducts 30 which connect the pilot valve with the pressure chambers for the valves 21–25 of the control valve assembly, can all be relatively thin plastic tubes and are disposed within a relatively small area. Because of the compact arrangement of these ducts, as well as the compact and substantially symmetrical arrangement of the timing device, pilot valve and control valve assembly, all of the apparatus at the top of the tank lends itself nicely to enclosure within a relatively small and attractive housing (not shown).

Figure 7:
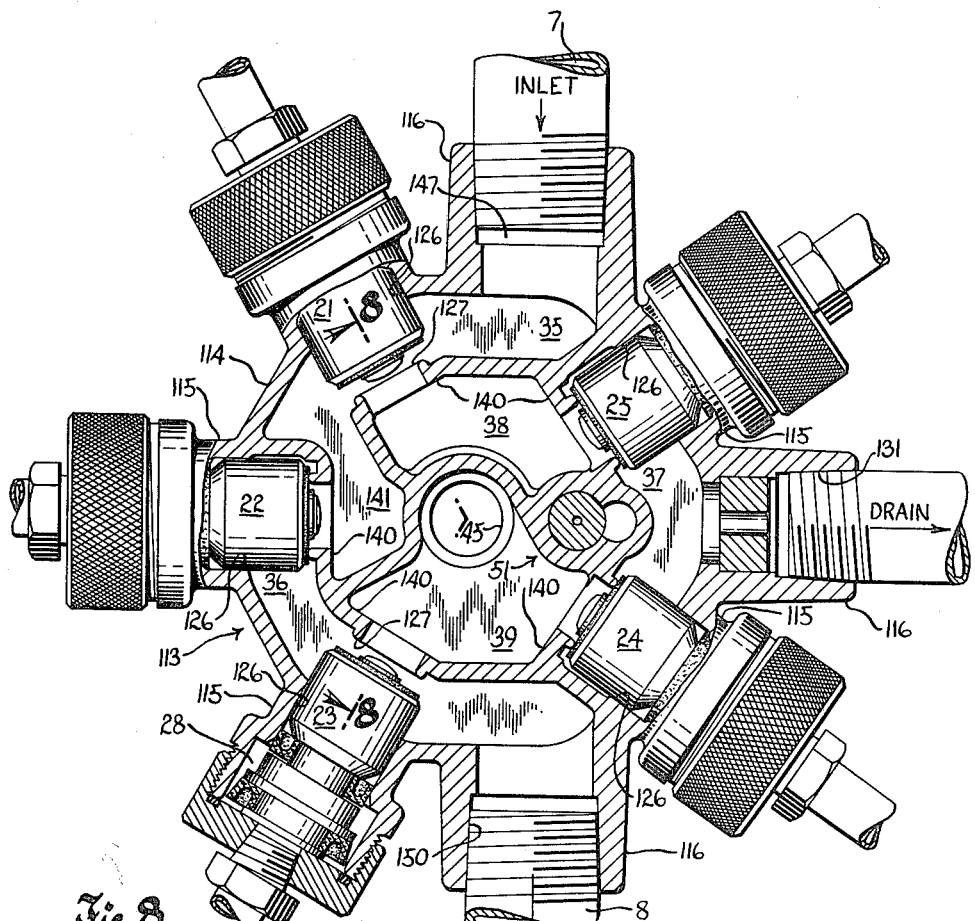
FIGURE 7 is a sectional view taken on the plane of the line 7—7 in FIGURE 6.
Figure 8:
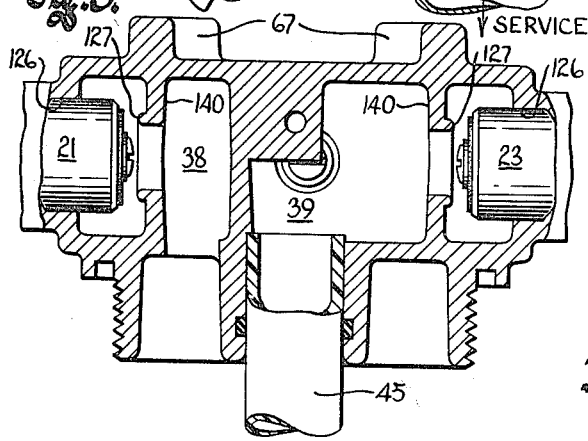
FIGURE 8 is a fragmentary sectional view taken on the plane of the line 8—8 in FIGURE 7.

In the modified embodiment of the control valve unit of this invention illustrated in FIGURES 5–8 the housing 113 is so formed as to dispose the control valves 21–25 radially to the axis of a water treating tank for which the housing provides a cover. This arrangement affords a somewhat less compact structure over all than the in-line valve arrangement in the housing of the previously described embodiment of the invention, but it may nevertheless be advantageous in certain installations.

In this case the housing has a generally polygonal outer wall 114 from which extend radially outwardly projecting cylindrical valve body portions 115 that provide the bores 126 in which the valve elements 21–25 are slidable and the pressure chambers 28 for those valves. Also projecting radially outwardly from the side wall are bosses or nipples 116 that provide the inlet port 147, the service port 150 and the drain port 131. Specifically, going clockwise from the inlet port 147, said port is circumferentially intermediate the bodies for valves 21 and 25, the drain port 131 is circumferentially intermediate valves 24 and 25, the service port is circumferentially intermediate valves 23 and 24, and the bodies of the valves 23, 22 and 21 are at closely spaced circumferential intervals at the side of the housing opposite the drain port. It will be observed that this arrangement of ports and valve bodies disposes the inlet, drain and service ports at right angles to one another to facilitate installation of plumbing connections to them.

Cooperating with the outer wall of the housing are inner partition members which divide the housing interior into compartments 35–39 corresponding to those in the first described embodiment of the invention, including partition elements 140 which are generally concentric with the outer wall 114 and in which are formed annular valve seats 127 that are coaxial with the bores in the valve body portions 115. The several compartments 35–39 are communicable with one another through the valve seats 127 in the same manner as the correspondingly numbered compartments in the first described embodiment of the invention. Again the inlet, service and drain compartments are outermost and the top-of-tank and bottom-of-tank compartments are innermost, the top-of-tank compartment 38 opening directly downwardly through the bottom of the housing to the top of the tank 5 (see FIGURES 6 and 8) and the bottom-of-tank compartment 39 communicating with the bottom of the tank through an elongated duct 45.

In this case, however, a portion 141 of the inlet compartment is circumferentially extended so as to be disposed radially inwardly of a part of the service compartment and communicable therewith through the seat for the valve 22, this being substantially a reversal of the relationship of the corresponding compartments at 41 in the FIGURES 1–4 embodiment of the invention but functionally the equivalent thereof.

The eductor 51 extends downwardly through the housing, at the side of its axis nearest the drain outlet, and has its outlet opening into a duct 55 which, again, terminates just above the bed of water treating material in the tank. The inlet 52 of the eductor is at all times communicated with the inlet compartment by means of a lateral passage 57 in the housing (see FIGURE 6), and its side eduction inlet 153 opens to the top of the housing near the drain outlet 131 but is inclined at a substantially large angle to the drain outlet so that a regenerant liquid duct 54 connected to the side inlet 153 does not interfere with a connection to the drain outlet.

Bar-like bosses 67 can be formed in the top wall of the housing, between which a lever or the like can be engaged, to enable the housing to be readily screwed into the threaded neck 43 of a tank for which it forms the cover.

Operation of the unit shown in FIGURES 5–8 is identical with that of the embodiment previously described.

From the foregoing description taken together with the accompanying drawings, it will be apparent that this invention provides a compact control valve assembly for an automatic water treating apparatus, forming the cover of a water treating tank and providing all of the connections to the tank, which are located within the interior of the tank. It will also be apparent that the apparatus of this invention is unusually compact, inexpensive and attractive in appearance, but is nevertheless very easy to install and highly efficient in operation, particularly in that it insures that highly concentrated regenerant liquid will be brought directly to the top of the bed of water treating material in the water treating tank, substantially undiluted by water in the upper portion of the tank.

What is claimed as my invention is:

1. A control valve for governing service and regenerating flow of fluid through a water treatment tank, comprising:
    (A) housing means providing a hollow valve body having
        (1) three control chambers each having a port in an external wall of the body, said chambers providing inlet, drain and service compartments the latter of which has a portion adjacent to a portion of the inlet compartment,
        (2) and a pair of adjacent system chambers each connectable with a water treatment tank and providing first and second tank compartments;
    (B) partition means in the body defining said compartments and including a partition wall member common to all of them, said partition means being arranged to dispose the system chambers at one side of said wall member and the control chambers at its opposite side, and so that
        (1) the first tank compartment has portions adjacent to the inlet and drain compartments,
        (2) the second tank compartment has portions adjacent to the service and drain compartments,
        (3) a first portion of said wall member separates the inlet compartment from both the service and first tank compartments,
        (4) a second portion of said wall member separates the service compartment from the second tank compartment,
        (5) and a third portion of said wall member separates the drain compartment from both the first and second tank compartments;
    (C) first and second internal ports in said first portion of the partition wall member to respectively communicate the inlet compartment with the first tank and service compartments;
    (D) a third internal port in said second portion of the partition wall member to communicate the service compartment with the second tank compartment and cooperable with the second port to communicate the inlet compartment with the second tank compartment;
    (E) fourth and fifth internal ports in said third portion of the partition wall member to respectively communicate the drain compartment with the second and first tank compartments;
    (F) and separately actuatable valve instrumentalities mounted on the body at said opposite side of the partition wall member and having valve members that are cooperable with said internal ports for selectively opening and closing the same, whereby the first tank compartment can be selectively communicated with either the inlet or drain compartments depending upon whether the valve member for the first or for the fifth internal port is open, the second tank compartment can be selectively communicated with either the service or the drain compartment depending upon whether the valve member for the third or for the fourth internal port is open, the second tank compartment can be communicated with the inlet compartment when the valve members for the second and the third internal ports are open at the same time, and the inlet compartment can be communicated with the service compartment whenever the valve element for the second internal port is open.

2. The control valve of claim 1, wherein said internal ports open to their respective control chambers through an annular valve seat at said opposite side of the partition wall member, and all portions of said valve instrumentalities are disposed at said opposite side of the partition wall member.

3. The control valve of claim 1, further characterized by another port in an external wall of the body, through which a fluid regenerant may be admitted into the body; and passage means in the body at all times communicating said other port with one of said tank compartments.

4. The control valve of claim 1, further characterized by means in the body defining an eductor having an inlet communicated with the inlet compartment, an outlet at all times in communication with one of said tank compartments, and an eduction port opening through an external wall of the body and connectable with a source of regenerant fluid.

5. The control valve of claim 1 further characterized by: mounting means on the valve body providing for securing the body to a water treatment tank and for closing an opening in a tank to which the body is secured, said mounting means providing a duct connecting with one of said tank compartments and by which the latter is communicable with the interior of a water treatment tank to which the body is secured; and the other tank compartment having walls providing a tank communicating passage located inside said duct.

6. In combination with a tank having an opening in its top and containing a bed of water treating material which must be regenerated from time to time by passing a regenerant fluid therethrough and then passing untreated water through the tank to rinse regenerant fluid out of the treating material and the tank:
    (A) a housing secured to the top of the tank to provide a cover closing said opening therein, said housing providing a valve body having
        (1) an inlet port connectable with a source of untreated water,
        (2) a service port connectable with a service system,
        (3) a drain port,
        (4) a regenerant port connectable with a source of regenerant fluid, and
        (5) a bottom port directly communicating with the top of the tank through said opening therein, through which untreated water normally enters the tank for downflow passage through the bed of treating material therein;
    (B) a first duct having an inlet connecting with the regenerant port and extending downwardly from the body and into the tank through the opening in its top, and terminating in an outlet above and close to the top of the bed of treating material, through which duct regenerant fluid can be introduced into the tank to flow downwardly through the bed of treating material therein;
    (C) a second duct connected with the body and extending downwardly therefrom through said tank opening and into the tank, and terminating in an outlet near the bottom of the tank;

(D) five flow control valves in the body, each movable between open and closed positions;
(E) first passage means in the body to communicate the inlet port with the bottom body port under the control of a first one of said valves, and through which water to be treated flows into the top of the tank when said first valve is open;
(F) second passage means in the body to communicate the second duct with the service port under the control of a second one of said valves, and through which treated water entering the outlet of said second duct can flow to a service system when said second valve is open;
(G) third passage means in the body under the control of a third one of said valves, to communicate the second duct with the drain port when said third valve is open, to thereby enable regenerant fluid effluent to be discharged from the tank via said second duct, after passage of regenerant fluid down through the bed of treating material in the tank;
(H) fourth passage means in the body cooperating with said second passage means and its valve to communicate said second duct with the inlet port under the control of a fourth one of said valves, to enable untreated water to flow down through the second duct for upflow rinsing of regenerant fluid from the material bed at times when said second and fourth valves are open;
(I) and fifth passage means in the body to communicate said bottom body port with the drain port under the control of the fifth one of said valves, to enable rinse water flowing upwardly in the tank to be discharged to the drain port via said bottom body port when said fifth valve is open.

References Cited in the file of this patent

UNITED STATES PATENTS

| | | |
|---|---|---|
| Re. 23,076 | Pick | Jan. 11, 1949 |
| 1,611,422 | Duden | Dec. 21, 1926 |
| 2,722,514 | Sloan | Nov. 1, 1955 |
| 2,825,359 | Williams | Mar. 4, 1958 |
| 2,897,968 | Nergaard | Aug. 4, 1959 |
| 2,902,155 | Lundeen | Sept. 1, 1959 |
| 2,999,514 | Kryzer | Sept. 12, 1961 |
| 3,080,975 | Rose | Mar. 12, 1963 |